United States Patent [19]

Tiegs et al.

[11] Patent Number: 4,950,392

[45] Date of Patent: Aug. 21, 1990

[54] FILTRATION TANK FOR FILTERING WASTE WATER USED IN WASHING MECHANICAL COMPONENTS

[75] Inventors: Mark D. Tiegs, Winona, Minn.; Reinald D. Liegel, Waukesha, Wis.

[73] Assignee: Hein-Werner Corporation, Waukesha, Wis.

[21] Appl. No.: 296,856

[22] Filed: Jan. 13, 1989

Related U.S. Application Data

[63] Continuation of Ser. No. 62,897, Jun. 15, 1987, abandoned.

[51] Int. Cl.[5] .............................................. B01D 29/11

[52] U.S. Cl. .................................... 210/167; 210/171; 210/172; 210/258; 210/416.1; 210/460

[58] Field of Search ................................ 134/109-111; 210/167, 168, 171, 172, 258, 416.1, 416.5, 460, 462

[56] References Cited

U.S. PATENT DOCUMENTS

| | | | |
|---|---|---|---|
| 2,385,150 | 9/1945 | Miller | 134/111 X |
| 2,619,231 | 11/1952 | Abbott, Jr. | 210/171 |
| 2,733,815 | 2/1956 | Kwochka et al. | 210/258 X |
| 3,020,918 | 2/1962 | Albertson et al. | 134/111 X |
| 3,066,803 | 12/1962 | Seils, Jr. | 210/168 |
| 3,259,521 | 7/1966 | Crall | 210/258 X |
| 3,355,026 | 11/1967 | Schut | 210/416.5 |
| 3,368,682 | 2/1968 | Boots | 210/167 X |
| 3,415,181 | 12/1968 | Hart | 210/167 X |
| 3,419,151 | 12/1968 | Smith et al. | 210/460 |
| 3,419,429 | 12/1968 | Zadrow et al. | 134/110 X |
| 3,616,917 | 11/1971 | Hellwege | 210/167 |
| 3,651,607 | 3/1972 | Lee, II | 210/167 X |
| 4,056,114 | 11/1977 | Boutillette | 210/167 X |
| 4,122,008 | 10/1978 | Allen | 210/167 X |
| 4,128,478 | 12/1978 | Metzger | 210/167 |
| 4,683,067 | 7/1987 | Aleman et al. | 210/167 X |

FOREIGN PATENT DOCUMENTS

| | | | |
|---|---|---|---|
| 1801975 | 1/1970 | Fed. Rep. of Germany | 134/111 |

*Primary Examiner*—Robert Spitzer
*Attorney, Agent, or Firm*—Michael, Best & Friedrich

[57] ABSTRACT

An apparatus for removing contaminates from caustic washing solution used in jet washers and the like such that the washing solution can be used for extended periods without replacement or disposal. The apparatus includes a filtration tank adapted to be connected to a tank of a jet washer for receiving caustic washing solution. The filteration tank houses a filter bag, and a pump is disposed in the filtration tank. The pump forces caustic washing solution through the filtration bag, to provide for removal of oil and grease from the washing solution, and also pumps washing solution into the tank of the jet washer to thereby cause flow of washing solution between the tank of the jet washer and the filtration tank.

22 Claims, 2 Drawing Sheets

Fig. 3

FILTRATION TANK FOR FILTERING WASTE WATER USED IN WASHING MECHANICAL COMPONENTS

This is a continuation of U.S. patent application Ser. No. 062,897, filed June 15, 1987, now abandoned.

FIELD OF THE INVENTION

The present invention relates to apparatus for use in filtering waste water, and more particularly to apparatus for use in removing waste materials from water used in washing mechanical components such as engine parts.

BACKGROUND PRIOR ART

In the repair and rebuilding of engine components and engines, the engine components or engines may be cleaned in jet washers. Jet washers comprise a housing adapted to contain one or more engine components, and a plurality of nozzles are mounted in the housing and used to direct jets of caustic cleaning solution against the surface areas of the engine components being cleaned. The components are mounted on a rotating platform adapted to support the components such that jets of caustic solution can remove all the dirt, grease and oil from the engine components. The jet washers also include a tank or reservoir located below the washing chamber and housing a quantity of caustic cleaning solution. As the jet washers are used, grease and oil accumulates in the caustic solution, and metals such as chromium, cadmium and the like may also accumulate in the washing solution.

Because of the accumulations of oil, grease and dirt in the washing solution, the solution must be periodically discharged and replaced with a clean caustic washing solution. However, because of the accumulations of metals such as chrome and cadmium in the solution, it must be disposed of carefully and such disposal can be expensive.

SUMMARY OF THE INVENTION

The present invention comprises an apparatus for removing contaminants from the caustic washing solution such that the solution can be used for extended periods without replacement or disposal. More particularly, the invention includes a filtration apparatus adapted to be connected to a jet washer or other apparatus using a washing solution for removing oil, grease and the like from parts being cleaned, the filtration apparatus receiving caustic washing solution from that apparatus and for removing contaminants from the washing solution. The filtration apparatus includes a filtration tank adapted to be connected to the tank of the jet washer or like apparatus, and a filter bag housed in the filtration tank. A pump is disposed in the filtration tank and functions to pump caustic washing solution through the filtration bag and also to pump washing solution into the tank of the jet washer to thereby cause flow of washing solution between the tank of the jet washer and the filtration tank. In operation of the filtration tank, the filter bag will effectively remove oil and grease from the caustic washing solution thereby permitting continued use of the washing solution for extended cycles and minimizing the required replacement of the caustic solution and disposal of contaminated solutions.

Various features and advantages of the invention will be apparent by reference to the following description of a preferred embodiment, from the drawings and from the claims.

Figure 1:
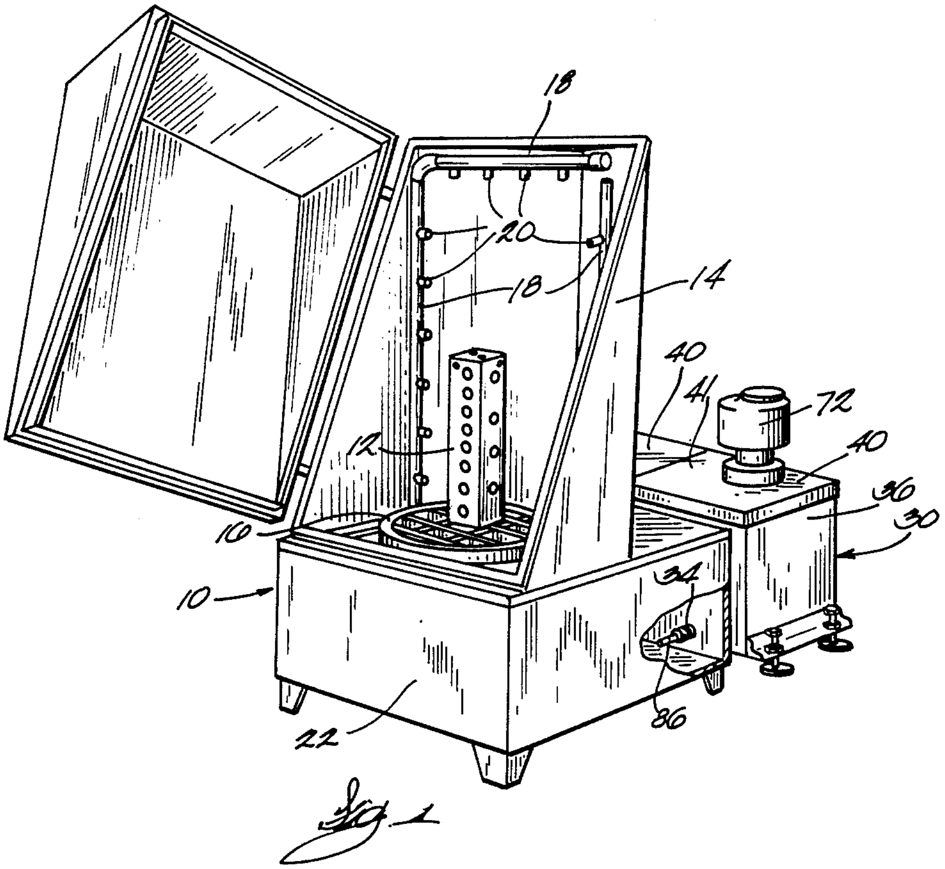
FIG. 1 is a perspective view of a jet washer in combination with a filtration tank embodying the invention and with a portion broken away.
Figure 2:
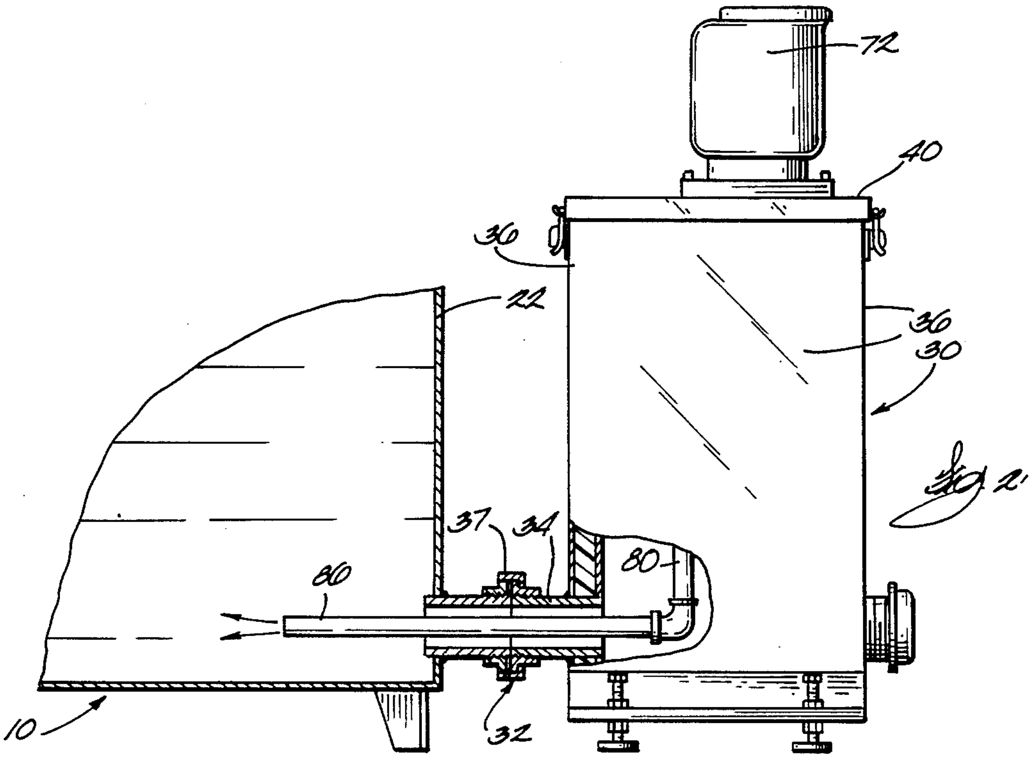
FIG. 2 is a partial elevation view of the apparatus shown in FIG. 1.
Figure 4:
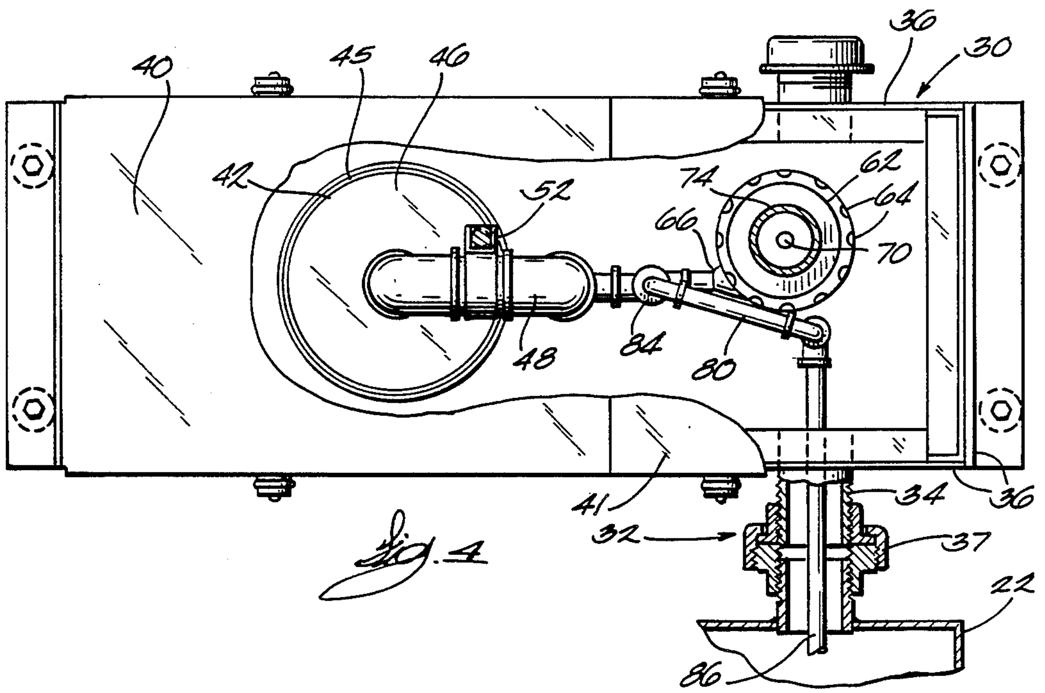
FIG. 4 is a plan view of apparatus shown in FIG. 3 and with portions shown in cross section.
Figure 3:
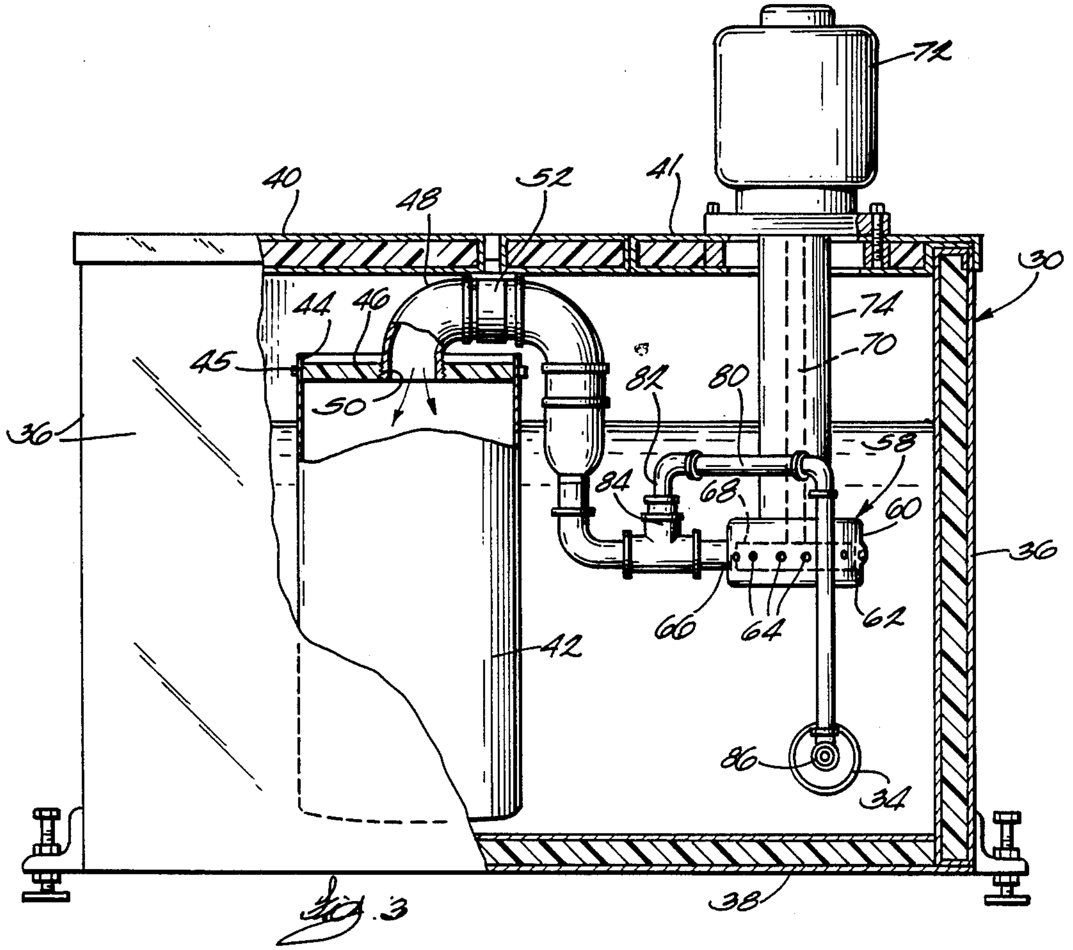
FIG. 3 is an enlarged side elevation view of the filtration tank shown in FIGS. 1 and 2 and with portions shown in cross section.

Before describing a preferred embodiment of the invention, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF A PREFERRED EMBODIMENT

Illustrated in FIG. 1 is a jet washer 10 of the type for use in automotive repair applications and for use in cleaning parts such as engine components 12. The jet washer 10 is conventional and is not illustrated or described in detail. Generally it includes a cabinet or container 14 adapted to house the parts or engine components 12 to be cleaned. The cabinet 14 houses a platform 16 adapted to support the engine components, and the platform 16 is supported for rotation about a central vertical axis. The cabinet 14 is also provided with a spray system for directing jets of caustic soda solution against the engine components supported on the platform. In the specific arrangement shown in the drawings, pipes 18 extend around the interior of the cabinet 14, and nozzles 20 project from the pipes, the nozzles 20 being functional to each direct a jet of caustic cleaning solution inwardly at the component to be washed. The jet washer 10 also includes a tank 22 adapted to contain a quantity of caustic solution and a pump (not shown) for supplying caustic solution from the tank 22 under pressure to the pipes 18. The caustic solution from the nozzles 20 impinges against the engine component 12 and then drains into the tank 22.

The apparatus illustrated in FIG. 1 further includes a filtration apparatus attached to the tank 22 of the jet washer 10 and for use in removing contaminants from the caustic cleaning solution in the jet washer tank. The filtration apparatus includes a filtration tank 30 having a construction similar to the tank 22 of the jet washer 10, the filtration tank 30 being connected to the jet washer tank 22 by a pipe and coupling assembly 32. More particularly, in the specific embodiment of the invention shown in the drawings, one end of a pipe 34 is welded to a lower portion of the filtration tank 30 and an opposite end of the pipe 34 is threaded and is adapted to be connected by a threaded coupling 37 to the tank 22 of the jet washer 10. The pipe 34 connecting the tank 22 of the jet washer 10 to the filtration tank 30 provides for flow of cleaning solution between the two tanks.

Referring more specifically to the construction of the filtration tank 30, it includes a plurality of sidewalls 36, a floor 38 supporting the sidewalls 36 and covers 40 and 41. The filtration apparatus further includes a filter 42 housed in the filtration tank 30 for removing contaminants from the solution. While in other embodiments of the invention, the filter 42 could have alternative constructions, in the illustrated arrangement the filter 42 comprises a bag having an open upper end 44, the upper end of the bag surrounding a circular disc 46, the periphery of the open end 44 of the bag surrounding the disc 46 and being clamped to the periphery of the disc 46 by a clamp or band 45.

While the filter 42 could be comprised of various materials, in one form of the invention the filter bag can be a Model OS 17 filter bag manufactured by Universal Filters, Inc., Asbury Park, NJ.

The circular disc 46 is supported in the filtration tank 30 by one end of a conduit or pipe 48. The circular disc 46 includes a central threaded aperture 50 and the circular disc 46 is threaded onto a threaded end of the pipe 48. The pipe 48 is in turn suspended by a bracket 52 fixed to the cover 41 of the filtration tank 30.

The apparatus embodying the invention further includes a pump assembly 58 for forcing washing solution through the filter 42. In the illustrated arrangement the pump assembly 58 includes an impeller pump 60 supported in filtration tank 30 below the level of the cleaning or washing solution. The impeller pump 60 includes pump housing 62 having a plurality of inlet openings 64 located around its periphery and a discharge port 66. A central impeller 68 is contained in the pump housing 62 and is driven by a drive shaft 70 extending downwardly from an electric motor 72. The pump housing 62 is supported by the lower end of a column 74 having an upper end secured to the cover 41 of the filtration tank 30.

The pipe 48 has an end connected to the discharge port 66 whereby washing solution from the filtration tank 30 is discharged by the pump 60 through the pipe 48 into the open upper end of the filter bag 42.

Means are also provided for causing circulation of washing solution between the jet washer tank 22 and the filtration tank 30. This means includes a pipe or conduit 80 having one end 82 connected by a T-joint 84 to the pipe 48 adjacent to the discharge port 66 of the pump 60. An opposite end 86 of the pipe 80 extends concentrically through the pipe 34 into the tank 22 of the jet washer. In operation of the filtration tank 30, the flow of washing solution through the discharge port 66 of the pump 60 will result in flow of washing solution through the pipe 48 and through the filtration bag 42. The pump 60 will also cause flow of washing solution through the pipe 80 into the jet washer tank 22 thereby causing circulation of washing solution between the filtration tank 30 and the jet washer tank 22.

In a preferred form of the invention the cover 40 will be removably latched in place and will be removable to permit convenient access to the filter bag 42 and removal and replacement of the filter bag.

While in the illustrated arrangement, the filtration tank is shown in continuation with a jet washer, it will be appreciated by those skilled in the art that the filtration tank is also useful with other cleaning apparatus employing washing solution.

Various features of the invention are set forth in the following claims.

We claim:

1. An apparatus for use with a washing apparatus having a tank for containing washing fluid and for filtering contaminants from washing fluid, the apparatus comprising:

a filtration tank adapted to contain washing fluid, means for providing for flow of washing fluid between the washing apparatus tank and the filtration tank, means for filtering washing fluid in the filtration tank, the means for filtering including a filter housed within the filtration tank, and means for forcing washing fluid in the filtration tank through the filter, the means for forcing washing fluid through the filter including a pump and a conduit having opposite ends, one of the opposite ends of the conduit being connected to the pump and the other of the opposite ends of the conduit discharging washing fluid through the filter.

2. Apparatus as set forth in claim 1 wherein the means for providing flow of washing fluid between the washing apparatus tank and the filtration tank includes a second conduit having opposite ends, one of the opposite ends of the second conduit being attached to the filtration tank, the other of the opposite ends communicating with the washing apparatus tank to provide for flow of washing fluid from the washing apparatus tank to the filtration tank.

3. Apparatus as set forth in claim 2 wherein the means for causing flow of washing fluid between the washing apparatus tank and the filtration tank further includes a third conduit having one end connected to the pump and an opposite end extending into the washing apparatus tank for discharging washing fluid from the pump into the washing apparatus tank.

4. Apparatus as set forth in claim 3 wherein at least a portion of the third conduit is housed in the second conduit.

5. Apparatus as set forth in claim 3 wherein the pump includes a discharge outlet and wherein said one end of said conduit is connected to said discharge outlet and wherein said one end of the third conduit is joined to the conduit in fluid communication adjacent to the pump discharge outlet.

6. Apparatus as set forth in claim 1 wherein the means for filtering includes means for supporting the filter, the means for supporting the filter including a disc supported in the filtration tank, the disc having a periphery and a central aperture housing said other of the opposite ends of the conduit, and wherein the filter comprises a bag having an open end surrounding the periphery of the disc and being secured to the periphery of the disc.

7. Apparatus as set forth in claim 6 wherein the means for providing flow of washing fluid between the washing apparatus tank and the filtration tank includes a second conduit having opposite ends, one of the opposite ends of the second conduit being attached to the filtration tank, the other of the opposite ends communicating with the washing apparatus tank to provide for flow of washing fluid from the washing apparatus tank to the filtration tank.

8. Apparatus as set forth in claim 7 wherein the means for causing flow of washing fluid between the washing apparatus tank and the filtration tank further includes a third conduit having one end connected to the pump and an opposite end extending into the washing apparatus tank for discharging water from the pump into the washing apparatus tank.

9. Apparatus as set forth in claim 8 wherein at least a portion of the third conduit is housed in the second conduit.

10. Apparatus as set forth in claim 8 wherein the pump includes a discharge outlet and wherein said one end of said conduit is connected to said discharge outlet and wherein said one end of the third conduit is joined to the conduit in fluid communication adjacent to the pump discharge outlet.

11. An apparatus for use with a washing apparatus having a tank for containing washing fluid and for filtering contaminants from washing fluid, the apparatus comprising:

a filtration tank adapted to contain washing fluid,
means for filtering washing fluid in said filtration tank, said means for filtering including a filter housed within said filtration tank,
means for forcing washing fluid in said filtration tank through said filter, said means for forcing washing fluid through said filter including a pump and a first conduit having opposite ends, one of said opposite ends of said first conduit being connected to said pump and the other of said opposite ends of said first conduit discharging washing fluid through said filter,
means for providing flow of washing fluid from the washing apparatus tank to said filtration tank, said means for providing flow of washing fluid from the washing apparatus tank to said filtration tank including a second conduit having opposite ends, one of said opposite ends of said second conduit communicating with said filtration tank and the other of said opposite ends of said second conduit communicating with the washing apparatus tank, and
means operable independently of said means for forcing washing fluid through said filter for providing flow of washing fluid from said filtration tank to the washing apparatus tank, said means for providing flow of washing fluid from said filtration tank to the washing apparatus tank including a third conduit having opposite ends, one of said opposite ends of said third conduit being connected to said pump and the other of said opposite ends of said third conduit extending into the washing apparatus tank for discharging washing fluid from said pump into the washing apparatus tank.

12. Apparatus as set forth in claim 11 wherein at least a portion of said third conduit is housed in said second conduit.

13. Apparatus as set forth in claim 11 wherein said pump includes a discharge outlet, wherein said one end of said first conduit is connected to said discharge outlet and wherein said one end of said third conduit is joined to said first conduit in fluid communication adjacent to said pump discharge outlet.

14. Apparatus as set forth in claim 11 wherein said means for filtering includes means for supporting said filter, said means for supporting said filter including a disc supported in said filtration tank, said disc having a periphery and a central aperture housing said other of said opposite ends of said first conduit, and wherein said filter comprises a bag having an open end surrounding said periphery of said disc and being secured to said periphery of said disc.

15. An apparatus for use with a washing apparatus having a tank for containing washing fluid, said apparatus comprising:

a filtration tank adapted to contain washing fluid,
filter means housed within said filtration tank,
a pump having a discharge outlet,
a first conduit having opposite ends, one of said opposite ends of said first conduit communicating with said pump discharge outlet and the other of said opposite ends of said first conduit discharging washing fluid through said filter means,
a second conduit having opposite ends, one of said opposite ends of said second conduit communicating with said filtration tank and the other of said opposite ends of said second conduit being adapted to communicate with the washing apparatus tank, and
a third conduit having opposite ends, one of said opposite ends of said third conduit communicating with said pump discharge outlet, at a location upstream of said filter means, and the other of said opposite ends of said third conduit being adapted to discharge washing fluid into the washing apparatus tank such that washing fluid flows from said pump discharge outlet to the washing apparatus tank without passing through said filter means.

16. Apparatus as set forth in claim 15 wherein at least a portion of said third conduit is housed in said second conduit.

17. An apparatus as set forth in claim 15 wherein said one of said opposite ends of said third conduit communicates with said first conduit.

18. An apparatus as set forth in claim 15 wherein said filter means includes a filter, and means for supporting the filter, the means for supporting the filter including a disc supported in the filtration tank, the disc having a periphery and a central aperture housing said other of the opposite ends of the conduit, and wherein the filter comprises a bag having an open end surrounding the periphery of the disc and being secured to the periphery of the disc.

19. An apparatus for use with a washing apparatus having a tank containing washing fluid and for filtering contaminants from washing fluid, the apparatus comprising:

a filtration tank adapted to contain washing fluid,
means for filtering washing fluid in said filtration tank, said means for filtering including a filter housed within said filtration tank,
means for forcing washing fluid in said filtration tank through said filter,
means for providing flow of washing fluid from the washing apparatus tank to said filtration tank, and
means operable independently of said forcing means for providing flow of washing fluid from said filtration tank to the washing apparatus tank.

20. Apparatus as set forth in claim 19 wherein said means for forcing washing fluid through said filter includes a pump and a first conduit having opposite ends, one of said opposite ends of said first conduit being connected to said pump and the other of said opposite ends of said first conduit discharging washing fluid through said filter.

21. Apparatus as set forth in claim 20 wherein said means for providing flow of washing fluid from the washing apparatus tank to the said filtration tank includes a second conduit having opposite ends, one of said opposite ends of said second conduit communicating with said filtration tank and the other of said opposite ends of said second conduit being adapted to communicate with the washing apparatus tank.

22. Apparatus as set forth in claim 21 wherein said means operable independently of said forcing means for providing flow of washing fluid from said filtration tank to the washing apparatus tank includes a third conduit having opposite ends, one of said opposite ends of said third conduit being connected to said pump and the other of said opposite ends of said third conduit being adapted to communicate with the washing apparatus tank for discharging washing fluid from said pump into the washing apparatus tank.

* * * * *